July 4, 1939.  L. M. McCARTHY  2,164,536
GARBAGE, ASH, AND REFUSE DISPOSAL, AND LAND RECLAMATION PROCESS
Filed Jan. 27, 1938  3 Sheets-Sheet 1
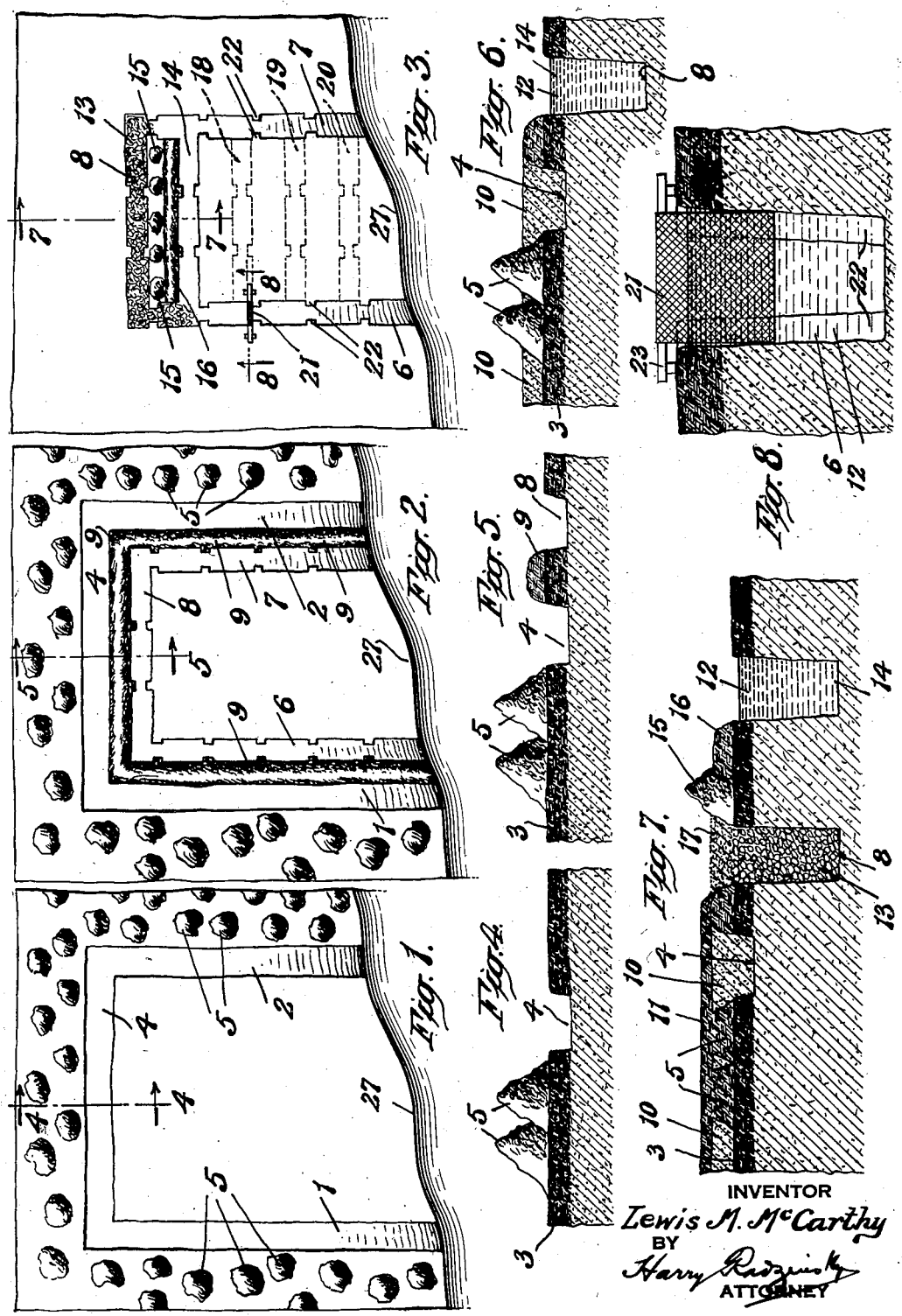
INVENTOR
Lewis M. McCarthy
BY
Harry Radzinsky
ATTORNEY

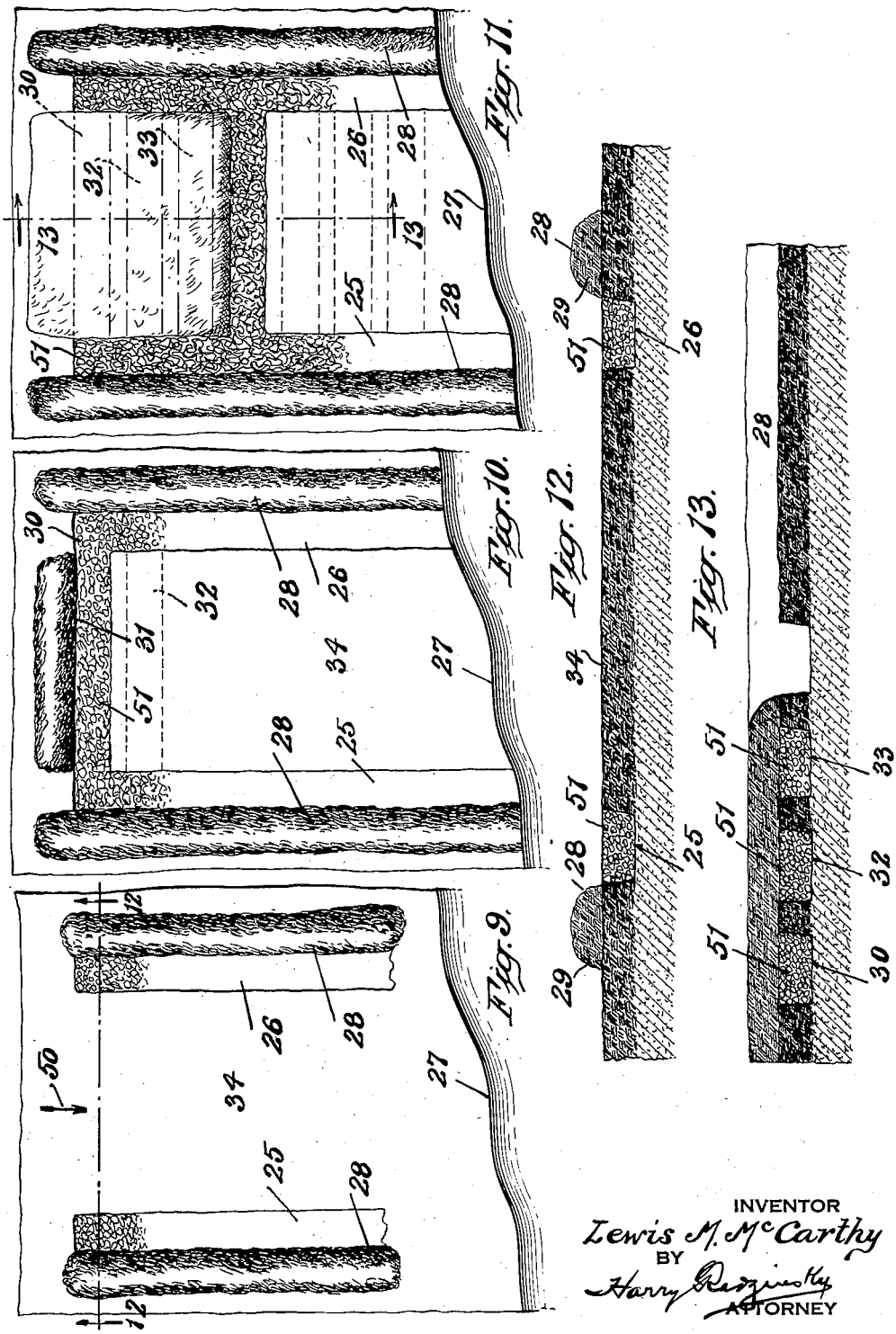

July 4, 1939. L. M. McCARTHY 2,164,536
GARBAGE, ASH, AND REFUSE DISPOSAL, AND LAND RECLAMATION PROCESS
Filed Jan. 27, 1938  3 Sheets-Sheet 3
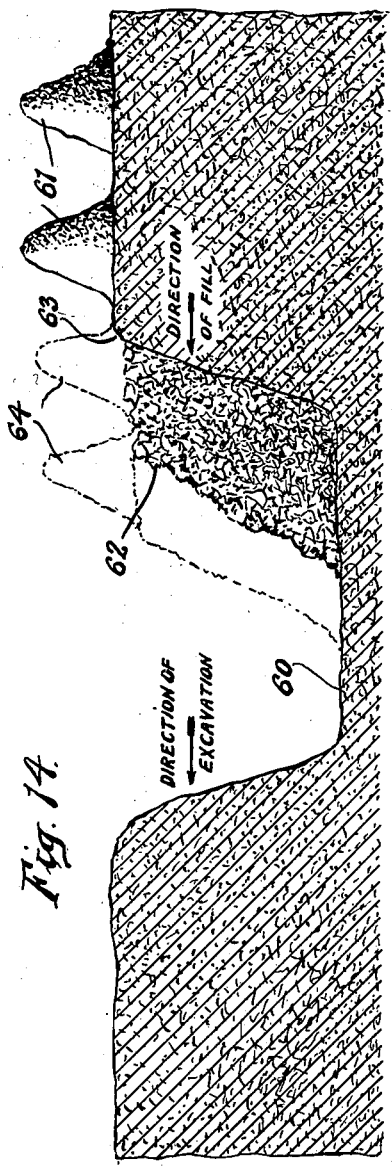
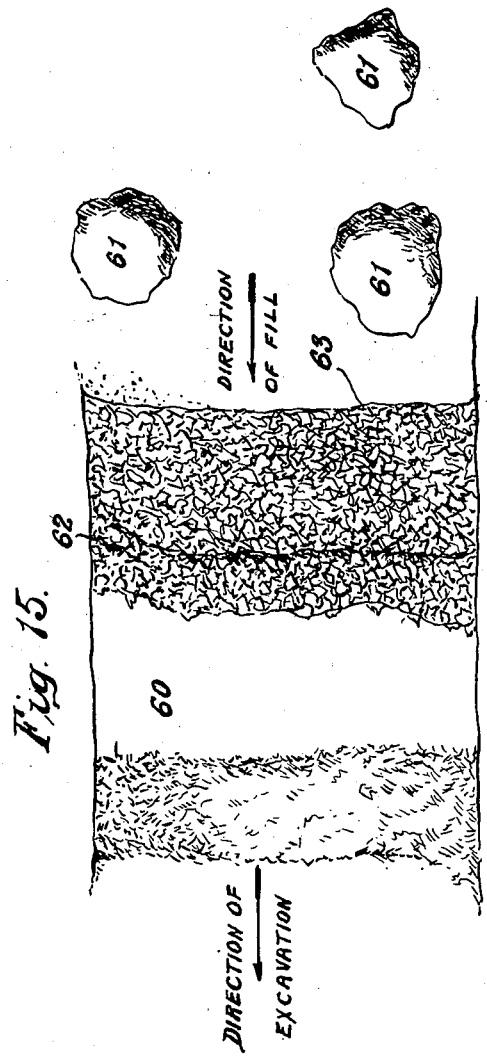
INVENTOR
Lewis M. McCarthy
BY
Harry Radzinsky
ATTORNEY Patented July 4, 1939

2,164,536

UNITED STATES PATENT OFFICE 2,164,536

GARBAGE, ASH, AND REFUSE DISPOSAL, AND LAND RECLAMATION PROCESS

Lewis M. McCarthy, New York, N. Y.

Application January 27, 1938, Serial No. 187,135

7 Claims. (Cl. 61—35)

This invention relates to a method of disposing of garbage, ashes, refuse and other inferior materials and to a land reclamation process, and more particularly to an improvement on the method described in my United States Reissue Patent No. 20,056, issued August 4, 1936. In that patent, a method is described wherein a trench is dug and filled with the inferior materials and an adjacent trench is next dug and the soil taken therefrom deposited on top of the inferior materials in the first trench. This procedure is repeated until the area of land to be reclaimed is covered, a large quantity of the inferior materials thus disposed of, and the land is raised.

In carrying out the method referred to in said patent, it often occurs that the land in which the inferior materials are to be buried, is so-called "waste" land; is marshy; is situated along the water front or is so located that access to it by garbage trucks or other conveyances is very difficult and often impossible. To enable the method of disposal and land reclamation to be effectively, economically and satisfactorily performed, it is desirable that methods be provided by which these waste or inferior lands can be used and thereby reclaimed and made of real value. This is of great importance because a great amount of this so-called "waste" land is available and owners of it are often quite willing to pay well for its reclamation or conversion to useful properly. The main object therefore, of this invention is to provide means by which an improved disposal method and land reclamation process can be carried out with land of an inferior nature, such as marshy or swamp land, or land fronting on or located adjacent to the water front.

A further object of the invention is to provide a land reclamation and garbage disposal method by which the inferior materials such as garbage, ashes, refuse and also sand and non-fertile soil may be disposed of by burial and be located far below the final surface of the land, which, when the job is complete, will have a top surface layer of superior and fertile soil.

In the accompanying drawings wherein several methods of procedure are disclosed, Fig. 1 is a diagrammatic plan view of the first step pursued in a method of garbage disposal and land reclamation, where the land to be reclaimed fronts on the water and access is had to it by a water or flotation means; Fig. 2 shows the second step in the method of dealing with the land area disclosed in Fig. 1; Fig. 3 shows the subsequent steps in this method; Fig. 4 is a sectional view on the line 4—4 of Fig. 1, looking in the direction of the arrows; Fig. 5 is a sectional view on the line 5—5 of Fig. 2, looking in the direction of the arrows; Fig. 6 is a sectional view showing sand or similar underlying soil removed from a transverse trench and distributed on adjacent territory prior to the spreading of the top soil; Fig. 7 is a sectional view on the line 7—7 of Fig. 3, looking in the direction of the arrows; Fig. 8 is a sectional view on the line 8—8 of Fig. 3 looking in the direction of the arrows; Figs. 9, 10 and 11 are successive views showing a method of procedure followed when water front or marshy land is to be dealt with and the excavating and filling operations are performed by trucks or other land vehicles operating from the land and progressing toward the water front; Fig. 12 is a sectional view on the line 12—12 of Fig. 9, looking in the direction of the arrows; and Fig. 13 is a sectional view on the line 13—13 of Fig. 11, looking in the direction of the arrows; Figs. 14 and 15 are views showing a modified method.

Referring first to the method shown in Figs. 1 to 8 inclusive. Here is diagrammatically shown a section of land adjoining the water front 27 to be reclaimed and used for the disposal of garbage, ashes, refuse or similar inferior materials. In this method the excavating machinery is mounted on barges or other floating vessels and proceeds inwardly from the water. The first step requires the formation of two spaced apart trenches 1, 2, and which extend inwardly from the water and proceed for some distance inland and extend substantially roughly parallel to one another. These canals are relatively shallow and are preferably formed by removal of the more fertile top soil 3 (Fig. 4). This is usually done by a dragline shovel on a caterpillar base with a long and wide tread. The two trenches 1 and 2 are connected at their inner ends by a transverse trench 4. The top soil removed by the formation of the trenches 1, 2 and 4 is preferably deposited about the land surrounding the trenches in heaps or piles designated at 5 in Figs. 1, 2 and 4. After trenches 1, 2 and 4 have been dug as above described by the removal of the top soil, a second set of trenches forming canals 6, 7 and 8 is dug and the top soil removed therefrom is heaped up between the canals 6, 7 and 8 and the trenches first produced at 1, 2 and 4, to form a barrier or wall 9 between the trenches and canals.

Canals 6, 7 and 8 are next dug out to a substantial depth, say from six to fifteen feet and the soil 10 removed by said digging operation is deposited in back of the barrier or bulkhead 9 thereby filling trenches 1, 2 and 4 and extending over the land adjacent thereto on which the piles of top soil 5 have been deposited. When the soil 10, comprising that which has been taken from canals 6, 7, and 8 is spread about the land on which the top soil is piled, and said soil 10 is leveled off, as indicated in Fig. 6, the piled top soil is then spread over or on top of the soil 10 as shown in Fig. 7. The result is that the land now surrounding canals 6, 7 and 8 is raised considerably and is covered with a layer of fertile top soil 11 (Fig. 7).

Canals 6, 7 and 8 having been now excavated to a substantial depth, contain sufficient water 12 to permit the flotation of garbage scows which proceed inwardly from the water front through either of canals 6 or 7 or both, to dump garbage, ashes, refuse or other inferior filling materials 13 in the transverse canal 8 as clearly shown in Figs. 3 and 7. While this disposition of the garbage or other inferior materials is occurring, a second transverse canal 14 extending parallel to the transverse canal 8 and located a short distance therefrom, is being dug. In digging canal 14 the top soil is first removed therefrom and piled up between the canals in piles 15 and also to form a barrier or bulkhead 16. Next the underlying soil 17 removed by the digging of canal 14 is distributed on top of the garbage fill 13 in canal 8 and also around the piled top soil 15, 16. Then said top soil 15, 16 is spread on top of the fill 17 to level off the ground and raise the same.

When canal 14 has been dug to the required depth and the soil taken therefrom has been distributed as just explained, said canal is then filled with garbage, refuse and other inferior materials, while another transverse canal, as indicated at 18, is dug and the top soil and underlying soil taken therefrom is deposited on top of the garbage, etc. in canal 14 as was explained in reference to the filling and covering of canal 8. By the production of successive transverse canals, examples of which are indicated at 19 and 20, the filling of such canals with garbage and the covering of such inferior fill by under-soil and then top soil, in the manner explained with respect to canal 8, garbage and the like is not only efficiently disposed of, but the land is raised and rendered fit for building or other purposes.

Since the canals 6, 7, 8, 14, 18, 19 and 20 fill more or less with water as they are excavated to the required depth, it may be found desirable to prevent the outflow of garbage and the like through the lead-in canals 6 and 7. This may be done by the use of one or more temporary barriers, one of which is indicated at 21 in Figs. 3 and 8, capable of being placed wherever required. These barriers may be made of mesh screen or the like and can fit down into any one of the canals at the required point and will prevent the floatation of solid matter out through canals 7 and 8. To assist the barriers and hold them in place, the various canals may be provided with projecting wall portions 22 located at spaced intervals, and serving to form shoulders or abutments against which the barriers may be pressed by the action of the fill material. Each barrier may be, as previously explained, a section of metallic mesh material suspended from a cross-member 23, resting at its ends on the ground on opposite sides of the canal in which the barrier is positioned.

The height to which the land is raised and reclaimed is dependent upon several factors. One of these factors is the depth to which the canals or trenches are dug, this governing the amount of filling material taken from these trenches. The amount of filling material thus removed and spread over the garbage fill regulates the height to which the land is raised. This is also governed by the position of the transverse trenches with respect to one another. That is to say, when they are spaced relatively far apart, the amount of soil taken from one trench has to be spread over and cover not only the top of the preceding trench but the area of land intervening between that trench and that which has just been dug. If that intervening space between the newly dug trench and that preceding it is relatively large, the soil taken from the newly dug trench, spread over the preceding trench and the intervening land will raise the land a relatively small amount. On the other hand, when the trenches are close together, the land intervening between them is relatively small and accordingly the soil removed from the last dug trench will pile high and raise the intervening land and that above the preceding filled trench for a considerable height.

The method herein disclosed is therefore flexible and may be used to suit different requirements and different situations as they arise, dependent primarily upon the location of the land, its relation to the water front and other factors.

In Figs. 9 to 13 a method is disclosed by which land situated along the water front or in marshy territory may be utilized by filling means operating toward the water front or in the direction of the arrow 50 in Fig. 9, as distinguished from the method of operations just described wherein the operations proceeded inland and in a direction away from the water front. By the method now to be described, a pair of spaced trenches 25 and 26 are dug, beginning at a selected inland point and working toward the water front 27. Top soil 28 removed from these trenches is piled up along the outer longitudinal sides thereof to form embankments or bulkheads 29 and 30 clearly shown in Figs. 9 and 12. Trucks proceeding from inland and working toward the water front, begin to fill in these trenches 25 and 26 with garbage, ashes, refuse, sand or any available inferior materials, said trucks by their progress toward the water front packing down the filling materials in said trenches to thereby support the weight of the trucks and form roads whereby subsequent loads of filling material may be transported over them to the water front.

When the trenches 25 and 26 have been completed as shown in Fig. 10, a transverse trench 30, located at the inner end of the trenches 25 and 26 is dug and the top soil removed therefrom deposited at the inland side of said trench as shown at 31. Trench 30 is now filled with garbage, ashes, refuse or other inferior materials 51 and when it has been filled to a level with the deposited filling materials partly filling trenches 25 and 26, a parallel transverse trench 32 is dug adjacent that shown at 30 and the soil removed therefrom is deposited on top of the filling material in trench 30. Then trench 32 is filled with garbage, ashes, refuse or other inferior materials and another transverse trench 33 is dug and the soil taken therefrom deposited on top of the fill in trench 32. The formation of these successive transverse trenches is continued and the trenches are successively filled and then covered by the soil removed from each subsequently formed trench until the entire area shown at 34 in Figs. 9 and 10 and located between the two trenches 25 and 26, has been completely filled, covered and consequently raised. While this filling and covering process is being continued, trenches 25 and 26 are being filled with garbage, etc. 51 and used as roads or transportation channels to enable the garbage or other fill to be progressively carried toward the water front to fill in the transverse trenches. When the last transverse trench, or in other words that located adjacent to the water front 27 is filled, the filled trenches 25 and 26 are then covered over by the top soil 28, which was previously used for the formation of the embankments or bulkheads 29. When this has been completed, the entire area, having its sides defined by the outer edges of trenches 25 and 26, and its inner end defined by the trench 30, has been filled and raised, and a great deal of garbage, ashes, refuse or other inferior materials effectively disposed of. In the particular method just described, the various trenches mentioned are relatively shallow since no effort is by this latter method made to utilize more than the top soil as covering for the garbage or other fill.

In Figs. 14 and 15 is disclosed a method of disposing of garbage and other waste materials where the nature of the land permits of this arrangement. In the arrangement there shown, a single trench-like excavation 60 is begun and the soil initially removed at the beginning of said excavation is deposited on top of the surrounding land, preferably in spaced heaps or piles as shown at 61. The purpose of heaping or piling the soil in this way, at least preliminarily, is to permit the entry of trucks over the land between the piles to the edge 63 of the excavation where the garbage or other waste material contents are dumped into the excavation beginning at one end thereof, or in other words, at the point of beginning of the excavation. At 62 is shown the garbage, refuse and other waste material deposited in the excavation to a level substantially even with the original height of the land. As the trucks continue to deposit the garbage in the excavation, the excavation is simultaneously gradually enlarged or extended, the digging apparatus working away from the point of beginning of the excavation in the direction indicated by the arrow in Fig. 14. As the soil is removed by the progressive enlargement of the excavation, it is deposited on top of the waste material that has been dumped in the excavation, either by spreading it on top of the waste material in a more or less uniform layer, or by depositing it in a series of spaced piles as shown at 64.

Thus, while the garbage and waste material is being progressively filled in at one end of the excavation, the opposite end of the excavation is being progressively enlarged and the soil removed by the enlarging process deposited in a layer, or else piled, on top of the waste material fill.

Eventually, the excavating will reach a point at the end of the land and there will either stop or continue angularly. As soon as it is no longer necessary for trucks to move over the top of the waste material fill deposited in the excavation, by reason of the excavation proceeding angularly or reaching a point of halt, the soil that has been deposited on top of the waste material in a plurality of heaps or piles 61, 64 may then be spread over the top of the entire filled-in excavation, this not only completely covering the waste material that was deposited in the excavation, but also raising the land thereover.

The purpose in depositing the soil taken from the excavation on top of the fill in a plurality of separate spaced piles rather than in layers is primarily to prevent the trucks carrying the waste material to the point of dump from being mired. It has been found that the waste material, such as garbage, ashes and the like, will pack down solidly and permit the passage of the trucks. Thus, when the entire excavation is filled with this waste material and trucks need no longer pass over it, the soil taken from the excavation and deposited on top of the waste material in piles can then be spread in even layers over the entire top of the filled excavation.

In describing the various methods of garbage, ashes, and refuse disposal herein, I have attempted to set forth methods suitable for employment under land conditions most frequently encountered and more likely to be used. It will be understood, however, that land conditions and other situations arise where departures from the specific methods disclosed are not only desirable, but necessary. Accordingly, I do not limit my invention to the precise methods disclosed, but consider the same broad enough to include all methods and arrangements coming within the scope of the annexed claims.

What I claim is:

1. A process of filling and reclaiming land which is normally under water at high tide comprising, digging a pair of canals inwardly from shore for a required distance, digging a transverse canal between and connecting said pair of canals, filling said transverse canal with inferior materials, digging a second transverse canal between the pair of canals, utilizing the soil removed from the second transverse canal as fill on top of the inferior materials in the first transverse canal to thereby elevate the land over said canal, digging successive transverse canals between the pair of inwardly extending canals, filling each of said transverse canals with inferior materials and in each instance utilizing the soil removed from a succeeding canal as fill on top of the inferior materials in the canal which precedes it.

2. A process of filling and reclaiming land which is normally under water at high tide comprising, digging a pair of canals inwardly from shore for a required distance, depositing the soil taken from said canals at the sides of the same to form bulk heads, digging a transverse canal between and connecting the inner ends of said pair of canals, filling said transverse canal with inferior materials, digging a second transverse canal between the pair of canals and adjacent and substantially parallel to the first transverse canal, utilizing the soil removed from the second transverse canal as fill on top of the inferior materials in the first transverse canal to thereby elevate the land over said canal, digging successive adjacent and substantially parallel transverse canals between the pair of inwardly extending canals, filling each of said transverse canals with inferior materials and in each instance utilizing the soil removed from a succeeding canal as fill on top of the inferior materials in the canal which precedes it.

3. A process of filling and reclaiming waterfront or marshy land, comprising, forming a pair of spaced transportation passages over which carriers for filling materials may proceed to a specified area to be filled and raised, digging a trench connecting said passages, filling said trench with the filling materials transported thereto by way of at least one of the transportation passages, digging a second trench between the passages, utilizing the soil removed from the second trench as fill on top of the filling materials deposited in the first trench, digging successive trenches between the passages, filling each of said trenches with filling materials carried into them by way of the transportation passages, and in each instance utilizing the soil removed from a succeeding trench as fill on top of the filling material previously deposited in the trench preceding it.

4. A process of filling and reclaiming waterfront or marshy land comprising, forming at least one transportation passage inwardly from the waterfront over which carriers for inferior filling materials may proceed to the area to be filled and reclaimed, digging a trench extending from the transportation passage at a point remote from the waterfront, filling said trench with inferior filling materials transported to it by way of the transportation passage, digging a second trench extending from the transportation passage and located adjacent to the first trench at a point closer to the waterfront and utilizing at least some of the soil taken from said trench as fill on top of the inferior filling materials deposited in the first trench, and repeating the trench digging and filling procedure just stated for the entire area to be filled and reclaimed, the trenches so produced being successively made closer to the waterfront.

5. The process of disposing of garbage, refuse and the like comprising, digging a pair of spaced canals extending inwardly from the waterfront, utilizing the soil taken from said canals to form a bulk head at one side of the canals, digging a transverse canal at the inner end of the inwardly extending canals to connect the same, transporting the garbage and refuse inwardly to the transverse canal by way of the inwardly extending canals, filling said transverse canal and also the inner ends of the inwardly extending canal with the garbage and refuse so transported, digging a second transverse canal between and connecting the inwardly extending canals, utilizing the soil taken from said second transverse canal as fill on top of the garbage and refuse deposited in the first transverse canal and in the inner ends of the inwardly extending canals, depositing garbage and refuse in said second transverse canal, digging a third transverse canal between the inwardly extending canals, utilizing the soil therefrom as fill on top of the garbage and refuse in the second transverse canal and continuing the digging and filling of successive transverse canals until the water front is reached.

6. A process of filling and reclaiming land and disposing of garbage and the like comprising, forming a pair of trenches extending along the area to be filled, filling said trenches with garbage and the like to thereby cause said trenches to constitute roadways over which garbage-transporting vehicles can pass, digging successive connecting trenches between the aforementioned two trenches, depositing garbage and the like in each of the connecting trenches, each of said filled connecting trenches being covered over by soil taken from a subsequently dug connecting trench, and after said connecting trenches have been filled and covered, then covering over the first dug pair of trenches with soil taken from them when they were dug.

7. A process of filling and reclaiming waterfront or marshy land, comprising, forming a pair of spaced transportation passages over which carriers for filling materials may proceed to a specified area to be filled and raised, depositing top soil removed by the formation of said passages in piles adjacent the passages, digging a trench connecting said passages, filling said trench with the filling materials transported thereto by way of at least one of the transportation passages, digging a second trench between the passages, utilizing the soil removed from the second trench as fill on top of the filling materials deposited in the first trench, digging successive trenches between the passages, filling each of said trenches with filling materials carried into them by way of the transportation passages, and in each instance utilizing the soil removed from a succeeding trench as fill on top of the filling material previously deposited in the trench preceding it, and finally distributing the piled top soil over the top of the filling materials.

LEWIS M. McCARTHY.